United States Patent
Azzi

(10) Patent No.: US 10,052,957 B2
(45) Date of Patent: Aug. 21, 2018

(54) CONTROL OF REGENERATIVE BRAKING IN AN ELECTRIC OR HYBRID VEHICLE

(71) Applicant: RENAULT S.A.S., Boulogne-Billancourt (FR)

(72) Inventor: Hamid Azzi, Maurepas (FR)

(73) Assignee: RENAULT S.A.S., Boulogne Billancourt (FR)

( * ) Notice: Subject to any disclaimer, the term of this patent is extended or adjusted under 35 U.S.C. 154(b) by 54 days.

(21) Appl. No.: 14/909,206

(22) PCT Filed: Jul. 4, 2014

(86) PCT No.: PCT/FR2014/051732
§ 371 (c)(1),
(2) Date: Apr. 7, 2016

(87) PCT Pub. No.: WO2015/018994
PCT Pub. Date: Feb. 12, 2015

(65) Prior Publication Data
US 2016/0257204 A1    Sep. 8, 2016

(30) Foreign Application Priority Data
Aug. 6, 2013 (FR) ...................... 13 57803

(51) Int. Cl.
*B60W 20/00* (2016.01)
*B60L 3/10* (2006.01)
(Continued)

(52) U.S. Cl.
CPC ............ *B60L 3/108* (2013.01); *B60L 3/104* (2013.01); *B60L 7/18* (2013.01); *B60L 7/26* (2013.01);
(Continued)

(58) Field of Classification Search
None
See application file for complete search history.

(56) References Cited

U.S. PATENT DOCUMENTS 5,615,933 A * 4/1997 Kidston ............... B60L 3/102
180/65.1
6,070,953 A * 6/2000 Miyago ................. B60L 7/10
188/156

(Continued)

FOREIGN PATENT DOCUMENTS

| EP | 2 543 536 A1 | 1/2013 |
|---|---|---|
| JP | 2000-344078 A | 12/2000 |
| JP | 2009-278840 A | 11/2009 |

OTHER PUBLICATIONS

International Search Report dated Mar. 2, 2015 in PCT/FR2014/051732 Filed Jul. 4, 2014.

(Continued)

*Primary Examiner* — Jonathan M Dager
(74) *Attorney, Agent, or Firm* — Oblon, McClelland, Maier & Neustadt, L.L.P.

(57) ABSTRACT

A method controls regenerative braking for a vehicle equipped with regenerative brakes and with a separate braking apparatus. The vehicle includes at least one first wheel and at least one second wheel. The separate braking apparatus is applied to the at least one first wheel and to the at least one second wheel. The regenerative brakes are applied to the at least one first wheel only. The method includes receiving a speed value of the first wheel and a speed value of the second wheel, estimating a value of a parameter representing a slip associated with the regenerative braking as a function of the speed value of the first wheel and as a function of the speed value of the second wheel, and forming a regenerative braking setpoint value as (Continued)

a function of the estimated value of the parameter representing slip associated with the regenerative braking.

13 Claims, 2 Drawing Sheets

(51) Int. Cl.
    *B60L 7/18*     (2006.01)
    *B60L 7/26*     (2006.01)
    *B60L 15/20*     (2006.01)
    *B60W 30/18*     (2012.01)
    *B60W 10/08*     (2006.01)
    *B60W 10/184*     (2012.01)
    *B60T 8/1761*     (2006.01)

(52) U.S. Cl.
    CPC ...... *B60L 15/2009* (2013.01); *B60T 8/17616* (2013.01); *B60W 10/08* (2013.01); *B60W 10/184* (2013.01); *B60W 30/18127* (2013.01); *B60L 2240/24* (2013.01); *B60L 2240/461* (2013.01); *B60L 2240/465* (2013.01); *B60T 2270/604* (2013.01); *B60T 2270/608* (2013.01); *B60W 2520/263* (2013.01); *B60W 2710/083* (2013.01); *Y02T 10/645* (2013.01); *Y02T 10/72* (2013.01); *Y02T 10/7275* (2013.01)

(56) References Cited

U.S. PATENT DOCUMENTS

| | | | | |
|---|---|---|---|---|
| 6,231,134 B1* | 5/2001 | Fukasawa | ................ | B60L 7/26 303/152 |
| 6,273,529 B1* | 8/2001 | Woywod | ............... | B60T 8/1755 303/139 |
| 6,957,874 B2* | 10/2005 | Hara | ........................ | B60K 6/44 180/165 |
| 8,066,339 B2* | 11/2011 | Crombez | ................ | B60L 7/18 303/152 |
| 8,521,350 B2* | 8/2013 | Minamiura | ............... | B60T 1/10 303/124 |
| 9,308,824 B1* | 4/2016 | Tamai | ....................... | B60L 7/18 |
| 9,393,940 B2* | 7/2016 | Lee | ........................... | B60L 7/10 |
| 9,457,777 B2* | 10/2016 | Gabor | ........................ | B60T 1/10 |
| 2002/0013194 A1* | 1/2002 | Kitano | ...................... | B60K 6/48 477/3 |
| 2003/0062770 A1* | 4/2003 | Sasaki | ...................... | B60T 8/00 303/152 |
| 2004/0090116 A1* | 5/2004 | Tsunehara | ................ | B60K 6/48 303/152 |
| 2006/0055240 A1* | 3/2006 | Toyota | .................. | B60K 6/365 303/152 |
| 2007/0126382 A1* | 6/2007 | Kang | ........................ | B60L 7/24 318/376 |
| 2007/0164606 A1* | 7/2007 | Goebels | ............. | B60T 8/17616 303/140 |
| 2009/0222156 A1* | 9/2009 | Krueger | .................... | B60L 7/26 701/22 |
| 2010/0017088 A1* | 1/2010 | Joyce | ....................... | B60T 8/172 701/73 |
| 2012/0116619 A1* | 5/2012 | Tate | ....................... | B60L 11/123 701/22 |
| 2012/0133202 A1* | 5/2012 | Mui | ......................... | B60L 3/10 303/152 |
| 2012/0203416 A1* | 8/2012 | Yoshimura | ............. | B60K 6/445 701/22 |
| 2012/0319465 A1* | 12/2012 | Koyama | ................... | B60T 1/10 303/3 |
| 2013/0030647 A1 | 1/2013 | Shimasaki et al. | | |
| 2013/0207453 A1* | 8/2013 | Knechtges | ............ | B60T 8/1764 303/189 |
| 2014/0121870 A1* | 5/2014 | Lee | ....................... | B60W 20/10 701/22 |
| 2014/0277983 A1* | 9/2014 | Bayar | ....................... | B60L 7/18 701/71 |
| 2014/0375113 A1* | 12/2014 | Higashi | ................... | B60T 13/16 303/10 |
| 2016/0121864 A1* | 5/2016 | Misunou | ................. | B60T 7/042 60/591 |
| 2016/0221553 A1* | 8/2016 | Watanabe | ............... | B60T 7/042 |
| 2017/0267220 A1* | 9/2017 | Serra | ........................ | B60T 8/52 |

OTHER PUBLICATIONS

French Search Report dated Apr. 22, 2014 in FR 1357803 Filed Aug. 6, 2013.

* cited by examiner

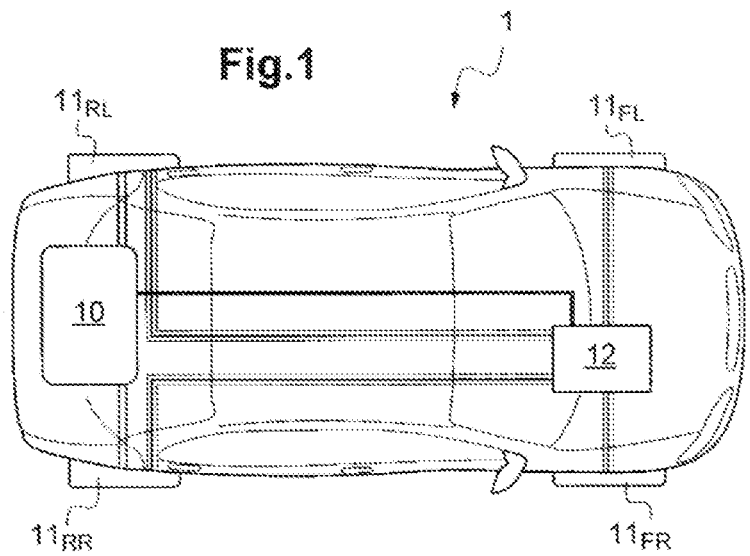
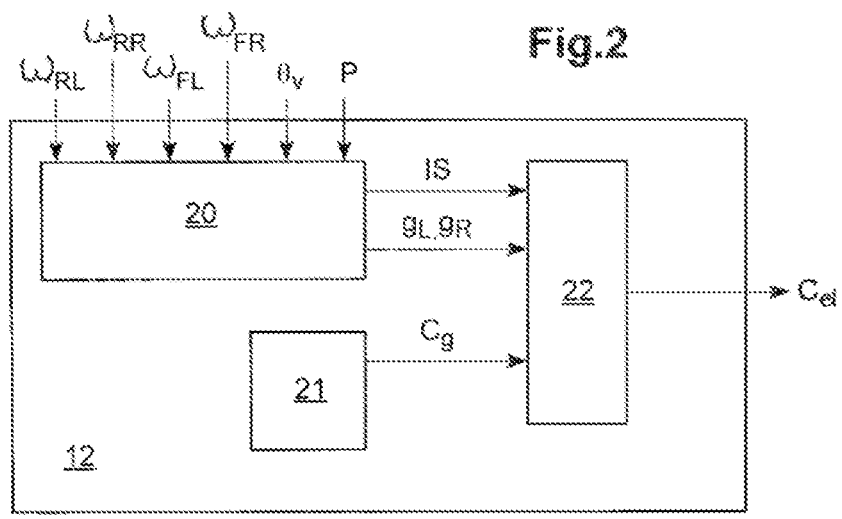

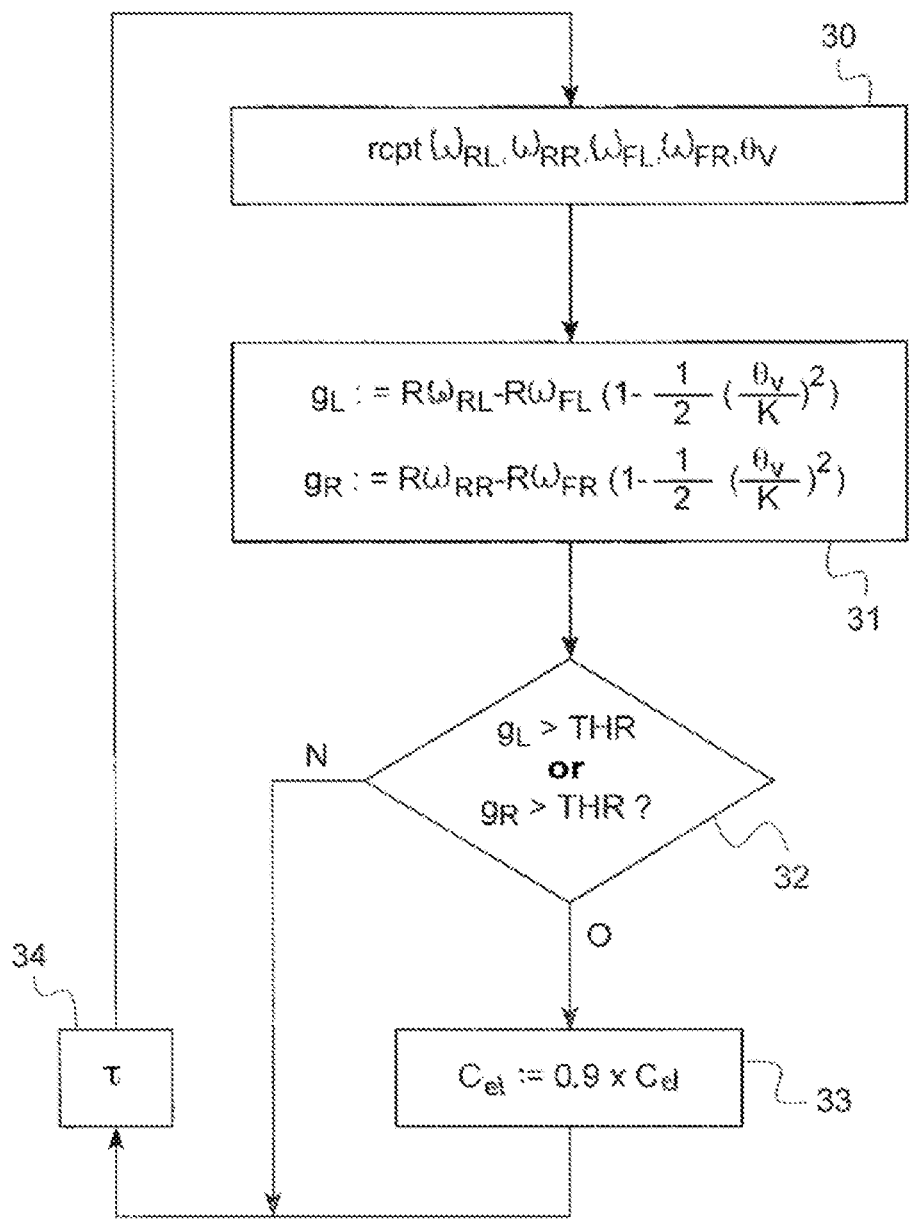

CONTROL OF REGENERATIVE BRAKING IN AN ELECTRIC OR HYBRID VEHICLE

The invention relates to control of the regenerative braking in a vehicle equipped with a first, regenerative, braking means and with a second braking means separate from the first braking means, for example a hydraulic braking means.

BACKGROUND

The vehicle may, for example, be an electrical or hybrid vehicle.

On a vehicle equipped with at least one electrical traction or propulsion motor, it is possible under certain conditions to use the electric motor as a generator and thus to obtain an electrical braking means. Such a use is advantageous because, being regenerative, it makes it possible to recover some of the kinetic energy of the vehicle in order to recharge the batteries.

In the case of decoupled braking, the vehicle may for example comprise a distribution ("Torque Blending") module arranged in order to distribute an overall braking command, coming from the brake pedal, between an electrical actuator and a hydraulic actuator. The situation is referred to as one with complementary braking setpoints.

According to another example, and particularly in the case of a vehicle with non-decoupled braking, a vehicle may comprise a braking management ("Torque Manager") module arranged in order to generate an electrical braking setpoint as a function of the driver setpoint, for example proportional to this driver setpoint. The electrical braking setpoint is then a supplementary braking setpoint, which is added to the conventional hydraulic braking obtained directly from the brake pedal.

The regenerative braking setpoint, whether it is complementary or supplementary, is formed as a function not only of the driver setpoint coming from a brake pedal, but also as a function of other parameters, one of which is a signal indicating the stability of the vehicle.

Specifically, the electrical braking is applied only to the driving wheels, that is to say to the front wheel or wheels in the case of a front-wheel drive vehicle, or to the rear wheel or wheels in the case of a rear-wheel drive vehicle. The potential for regenerative braking is therefore more limited than braking applied to all the wheels.

This regenerative braking therefore risks causing greater slipping of the wheels in question, or even of causing locking of the wheels when the grip conditions are relatively precarious, for example in the case of a road which is wet or covered with ice or snow.

It is known to deactivate the regenerative braking when an active safety system, for example a system to prevent wheel lock, for example ABS (from the German "Antiblockiersystem"), and/or a system to prevent wheel slip, for example an ESC ("Electronic Stability Control") system, detects a hazardous situation, for example when a flag signal formed by this active safety system changes to 1.

BRIEF SUMMARY

These active safety systems are in communication with one or more sensors capable of providing information about the state of the wheels.

U.S. Pat. No. 7,077,484 describes a braking control method with a more refined response than simple deactivation of the regenerative braking. A locking risk value is calculated as a function of a value of an estimated slip factor.

The slip factor for a wheel depends on the speed at the center of the wheel, which can be measured relatively accurately, and on a reference speed value. In this document, this reference speed and this slip factor are taken from a preloaded table.

There is a need for more accurate control of regenerative braking.

The reference speed of the vehicle may in fact be different to the speed at the center of the wheel, in particular because of the deformation of the tire and the existence of microslips.

In the case of a free wheel the slip is zero, that is to say the speed at the center and at the periphery of the wheel are equal.

In order to determine a reference speed value, it is therefore conceivable to equip a vehicle with a free fifth wheel and to measure the rotational speed at the center of this wheel, or alternatively to use data coming from a navigation system of the GPS (Global Positioning System) type.

There is nevertheless a need for regenerative braking control making it possible to balance accuracy and simplicity.

A method is provided for controlling regenerative braking in a vehicle equipped with a first, regenerative, braking means, for example an electrical braking means, and with a second braking means separate from the first braking means, for example a hydraulic braking means. The vehicle comprises at least one first wheel and at least one second wheel. The second braking means is applied to this at least one first wheel and to this at least one second wheel. The first braking means is applied to this at least one first wheel only. The method comprises:

reception of a speed value of a first wheel and a speed value of a second wheel, estimation of a value of a parameter representing the slip associated with the regenerative braking as a function of the speed value of the first wheel and as a function of the speed value of the second wheel, formation of a regenerative braking setpoint value as a function of the value of the parameter representing slip associated with the regenerative braking.

Expressed another way, rather than estimating an overall reference speed value of the vehicle, which would make it possible to estimate the slip of each of the wheels, this slip being liable to be due to the hydraulic braking and to the regenerative braking, as the case may be, it is preferred to estimate a value of a parameter representing partial slip, that is to say here associated with the regenerative braking, on the basis of a speed measurement taken at at least one wheel of the vehicle which does not experience regenerative braking.

Thus, the assumption is in some way made that the slip, in the case of a wheel experiencing both regenerative braking and hydraulic braking, can be written as the sum of a slip value due to the regenerative braking and of a slip value due to the hydraulic braking. By comparing the speeds at the center of a wheel not experiencing regenerative braking with the speed at the center of a wheel experiencing this regenerative braking, it is thus possible to evaluate the slip due to the regenerative braking, and therefore to control the regenerative braking so as to keep this slip in a grip range.

This regenerative braking setpoint value may be transmitted to the regenerative braking means in order to be applied to the first wheel or to this at least one first wheel.

This regenerative braking setpoint value may be estimated on the basis of speed values of a single first wheel and a single second wheel, or alternatively of a plurality of first wheels and a plurality of second wheels.

Advantageously and without limitation, the method may comprise a step of comparing the parameter value representing the slip associated with the regenerative braking with a slip threshold. If this value is greater than or equal to this threshold, a decrease of the regenerative braking setpoint value may be instigated.

Advantageously and without limitation, these steps of estimation of a slip value, of comparison with a threshold, and of instigation may be repeated regularly. Expressed another way, a closed loop is set up in order to slave the regenerative braking setpoint. The value of the parameter representing the slip associated with the regenerative braking may be slaved so that this value remains below the threshold.

Advantageously and without limitation, the value of the parameter representing the slip associated with the regenerative braking for a first wheel may be estimated as a function of a speed value of the second wheel lying on the same side of the vehicle as this first wheel.

For example, for a four-wheel drive vehicle, the value of the regenerative braking of the right rear wheel will be estimated as a function of the speed at the center of the right rear wheel, and as a function of the speed at the center of the right front wheel.

This is because it may be assumed that the wheels located on the same side of a vehicle are in general made to be in contact with surfaces which are more similar than the wheels on either side of the vehicle.

Furthermore, estimating the slip due to the regenerative braking for a wheel on the basis of a speed value of another wheel located on the same side of the vehicle, rather than on the basis of an average speed value of the two front wheels, in the case of a rear-wheel drive vehicle (or an average speed value of the two rear wheels in the case of a front-wheel drive vehicle), can allow more accurate control, particularly in so-called "μ-split" situations in which one side of the vehicle experiences more slip than the other side.

Advantageously and without limitation, provision may be made to calculate a pseudo-speed value $w_2'$ of the second wheel on the basis of the speed value at the center of this second wheel according to $$w_2' = w_2 \cdot \left(1 - \frac{1}{2}\left(\frac{\theta_v}{K}\right)^2\right)$$

where $w_2$ is the speed value at the center of the second wheel, $\theta_v$ is a value of the angle at the steering wheel, coming from a steering wheel angle sensor, and where $K$ is a value of a demultiplication factor of a steering column.

Thus, this pseudo-speed value is an estimate of the speed which the second wheel would have if it was on the same path as the first wheel.

When the vehicle is in a straight line, the pseudo-speed value is thus equal to the speed value at the center.

Advantageously and without limitation, provision may be made to apply the formula above by default, and optionally to detect straight-line situations, and then to select pseudo-speed values directly equal to the speed value at the center.

As an alternative, provision may be made to detect cornering situations and to apply the formula above only in the event that a cornering situation is detected.

The regenerative braking setpoint may, for example, be complementary to a non-regenerative braking setpoint applied by the second braking means, supplementary in relation to the braking applied by this second braking means, or the like.

The invention may find an application in all vehicles which have a torque actuator making it possible to recover energy, that is to say in particular electrical or hybrid vehicles, as well as internal combustion vehicles equipped with an alternator, for example an alternator-starter allowing a large braking torque.

A computer program product comprising instructions for carrying out the steps of the method described above when these instructions are executed by a processor is furthermore provided.

This computer program may, for example, be stored on a hard disk type medium, or it may be downloaded, or the like.

A device is furthermore provided for controlling regenerative braking for a vehicle equipped with a first, regenerative, braking means and with a second braking means separate from the first braking means, the vehicle comprising at least one first wheel and at least one second wheel, the second braking means being applied to said at least one first wheel and to said at least one second wheel, and the first braking means being applied to said at least one first wheel only, the control device comprising:

reception means for receiving a speed value of a first wheel and a speed value of a second wheel, first processing means for estimating a value of a parameter representing the slip associated with the regenerative braking as a function of the speed value of the first wheel and as a function of the speed value of the second wheel, and second processing means for forming a regenerative braking setpoint value as a function of the estimated value of the parameter representing slip associated with the regenerative braking.

Thus, this device can make it possible to carry out the method described above. This device may, for example, comprise or be integrated in one or more processors, for example a microcontroller, a microprocessor or the like. The reception means may for example comprise an input port, an input pin or the like. The first and second processing means may or may not be separate. They may, for example, be processor cores or CPUs ("Central Processing Units"). The device may furthermore comprise transmission means, for example an output port, an output pin or the like, for sending the regenerative braking setpoint value to the first braking means.

The received speed values may come from respective sensors.

A vehicle, for example a motor vehicle, for example electrical or hybrid, comprising the control device described above is furthermore provided.

The invention will be understood more clearly with reference to the figures, which illustrate nonlimiting embodiments given by way of example.

BRIEF DESCRIPTION OF THE DRAWINGS

FIG. 1 is a highly schematic view from above of an example of a vehicle according to one embodiment of the invention.

FIG. 2 schematically represents an example of a control device according to one embodiment of the invention.

FIG. 3 is a flowchart of an example of a method according to one embodiment of the invention.

DETAILED DESCRIPTION

Referring to FIG. 1, a vehicle 1 comprises an internal combustion engine (not represented), and an electric motor 10 capable of driving the rear wheels $11_{RL}$, $11_{RR}$. The vehicle furthermore comprises front wheels $11_{FL}$ and $11_{FR}$. The front wheels and the rear wheels all experience hydraulic braking. Conversely, the electrical braking as applied via the electric motor 10 is experienced only by the rear wheels $11_{RL}$, $11_{RR}$.

An ESC module 12 receives measurement values of shaft rotation sensors making it possible to measure speeds at the centers of the front wheels and rear wheels. This ESC module is in communication, for example via a CAN ("Controller Area Network") bus, with the electrical actuator 10.

FIG. 2 shows the operation of the ESC 12 in more detail.

The ESC 12 comprises a stability module 20 receiving values of rotation at the center of the front and rear wheels, as well as a braking pressure value P and a steering wheel angle value $\theta_v$ coming from a steering wheel angle sensor of the vehicle.

This module 20 makes it possible to generate a flag value IS and two values of parameters representing the slips associated with the electrical braking of the left and right rear wheels, respectively $g_L$ and $g_R$.

A calculation module 21 for calculating the driver setpoint $C_g$ makes it possible, on the basis of signals which are not represented and include in particular a stop contactor signal and a master cylinder pressure signal, to generate the overall setpoint value $C_g$ corresponding to an estimate of the driver's intention to brake. This type of calculation module is known per se and will not be described in further detail.

A braking management ("torque manager") module receives the flag signal value IS, the parameter values $g_L$, $g_R$ representing the slips associated with the electrical braking, and the overall braking setpoint value $C_g$, and generates an electrical braking setpoint $C_{el}$ as a function, in particular, of these received values.

For example, when the flag IS is at 1, the electrical braking is deactivated, that is to say the setpoint $C_{el}$ is zero.

When the values $g_L$, $g_R$ are less than a threshold, the electrical braking setpoint value $C_{el}$ is selected to be proportional to the overall braking setpoint value $C_g$, for example equal to 10 or 20% of this value.

The supplementary electrical braking setpoint value $C_{el}$ is sent to the electrical machine referenced 10 in FIG. 1.

FIG. 3 is a flowchart schematically illustrating an example of a method carried out by the ESC module.

The method includes a step 30 of receiving the rotational speed values of the wheels and the steering wheel angle value.

During a step 31, values of the slip parameters $g_L$, $g_R$ associated with the regenerative braking for the left and right rear wheels, respectively, are calculated by applying the formulae below:

$$g_L = Rw_{RL} - Rw_{FL}\left(1 - \frac{1}{2}\left(\frac{\theta_v}{K}\right)^2\right), \text{ and}$$

$$g_R = Rw_{RR} - Rw_{FR}\left(1 - \frac{1}{2}\left(\frac{\theta_v}{K}\right)^2\right)$$

in which
R is the radius of the wheels, which is assumed to be identical from one wheel to another,
$w_{RL}$ is the angular rotational speed at the center of the left rear wheel,
$w_{FL}$ is the angular rotational speed at the center of the left front wheel,
$w_{RR}$ is the angular rotational speed at the center of the right rear wheel,
$w_{FR}$ is the angular rotational speed at the center of the right front wheel,
$\theta_v$ is the value of the angle at the steering wheel, received in step 30, and
K is a value of a demultiplication factor of the steering column.

Then, during a test step 32, these values $g_L$, $g_R$ are compared with a threshold THR.

In this example, the test is positive if one of the values is greater than the threshold THR.

In this case, the electrical braking setpoint value $C_{el}$ is reduced, for example decremented by 10%, during a step 33.

Then, after a waiting step 34, these various steps 31, 32, 33 are repeated. Such a closed loop thus makes it possible to slave the electrical setpoint value so that the slip associated with the electrical braking remains below the threshold THR.

The loop may furthermore comprise a step (not represented) of transmitting electrical braking setpoint value $C_{el}$ to the electrical actuator, so that a braking force corresponding to this setpoint value is applied to the rear wheels.

This threshold THR may be selected so that the slip remains in a grip range in which the grip, that is to say the ratio between the drag force and the weight, varies linearly with the slip. Expressed another way, the vehicle is kept in this grip range.

Returning to FIG. 2, if this regulation carried out on the basis of the slip values $g_L$, $g_R$ associated with the electrical braking proves insufficient, the stability indicator module 20 will form a flag IS with a value equal to 1, which deactivates the regenerative braking.

In the embodiment represented, the vehicle is a rear-wheel drive vehicle, that is to say the electrical braking is applied to the rear wheels. It is clear that the method could be adapted to the case of a front-wheel drive vehicle.

The invention claimed is:

1. A method for controlling regenerative braking for a vehicle equipped with a first braking means and with a second braking means separate from the first braking means, the first braking means being a regenerative braking means, the vehicle comprising at least one first wheel and at least one second wheel, the second braking means being applied to said at least one first wheel and to said at least one second wheel, and the first braking means being applied to said at least one first wheel and not said at least one second wheel, the method comprising:
   receiving a speed value of said at least one first wheel and a speed value of said at least one second wheel;
   estimating a value of a parameter representing a slip associated with the regenerative braking as a function of the speed value of said at least one first wheel and as a function of the speed value of said at least one second wheel; and
   forming a regenerative braking setpoint value as a function of the estimated value of the parameter representing the slip associated with the regenerative braking,
   wherein the value of the parameter representing the slip associated with the regenerative braking for said at least one first wheel is estimated as the function of the speed value of said at least one second wheel lying on a same side of the vehicle as said at least one first wheel and not any wheels lying on a side of the vehicle opposite the same side of the vehicle.

2. The method as claimed in claim 1, further comprising:
comparing the value of the parameter representing the slip associated with the regenerative braking with a slip threshold; and
when the value of the parameter is greater than or equal to the slip threshold, instigating a decrease of the regenerative braking setpoint value.

3. The method as claimed in claim 2, wherein the receiving, the estimating, the comparing, and the instigating are repeated regularly.

4. The method as claimed in claim 1, wherein the estimating includes calculating a pseudo-speed value of said at least one second wheel based on the speed value at a center of said at least one second wheel according to:

$$w'_2 = w_2 \cdot \left(1 - \frac{1}{2}\left(\frac{\theta_v}{K}\right)^2\right)$$

where $w_2$ is the speed value at the center of said at least one second wheel, $\theta_v$ is a value of an angle at a steering wheel, coming from a steering wheel angle sensor, and where K is a value of a demultiplication factor of a steering column.

5. A non-transitory computer readable medium storing instructions that, when executed by a processor of a computer, causes the computer to execute the method as claimed in claim 1.

6. A device for controlling regenerative braking for a vehicle equipped with a first braking means and with a second braking means separate from the first braking means, the first braking means being a regenerative braking means, the vehicle comprising at least one first wheel and at least one second wheel, the second braking means being applied to said at least one first wheel and to said at least one second wheel, and the first braking means being applied to said at least one first wheel and not said at least one second wheel, the control device comprising:
reception means for receiving a speed value of said at least one first wheel and a speed value of said at least one second wheel;
first processing means for estimating a value of a parameter representing a slip associated with the regenerative braking as a function of the speed value of said at least one first wheel and as a function of the speed value of said at least one second wheel; and
second processing means for forming a regenerative braking setpoint value as a function of the estimated value of the parameter representing slip associated with the regenerative braking,
wherein the value of the parameter representing the slip associated with the regenerative braking for said at least one first wheel is estimated as the function of the speed value of said at least one second wheel lying on a same side of the vehicle as said at least one first wheel and not any wheels lying on a side of the vehicle opposite the same side of the vehicle.

7. A motor vehicle comprising:
the device as claimed in claim 6;
the first braking means and the second braking means, which is separate from the first braking means; and
at least one first wheel and at least one second wheel,
wherein the second braking means is applied to said at least one first wheel and to said at least one second wheel, and the first braking means being applied to said at least one first wheel and not said at least one second wheel.

8. The motor vehicle as claimed in claim 7, further comprising:
an electrical actuator.

9. The motor vehicle as claimed in claim 7, wherein said at least one first wheel includes one or more rear wheels of the motor vehicle.

10. A system for controlling regenerative braking for a vehicle equipped with a first brake system and a second brake system separate from the first brake system, the first brake system being a regenerative brake system, the vehicle comprising at least one first wheel and at least one second wheel, the second brake system being applied to said at least one first wheel and to said at least one second wheel, and the first brake system being applied to said at least one first wheel and not said at least one second wheel, the system comprising:
circuitry configured to
receive a speed value of said at least one first wheel and a speed value of said at least one second wheel,
estimate a value of a parameter representing a partial slip associated with the regenerative braking as a function of the speed value of said at least one first wheel experiencing regenerative braking and as a function of the speed value of said at least one second wheel that does not experience regenerative braking, and
form a regenerative braking setpoint value as a function of the estimated value of the parameter representing the partial slip associated with the regenerative braking,
wherein the estimating the value of the parameter representing the partial slip associated with the regenerative braking includes comparing a first output of the function of the speed value of said at least one first wheel experiencing regenerative braking with a second output of the function of the speed value of said at least one second wheel that does not experience regenerative braking, and
wherein the value of the parameter representing the partial slip associated with the regenerative braking for said at least one first wheel is estimated as a function of the speed value of said at least one second wheel lying on a same side of the vehicle as said at least one first wheel and not any wheels lying on a side of the vehicle opposite the same side of the vehicle.

11. The system as claimed in claim 10,
wherein the circuitry is configured to
compare the value of the parameter representing the partial slip associated with the regenerative braking with a slip threshold, and
when the value of the parameter is greater than or equal to the slip threshold, instigate a decrease of the regenerative braking setpoint value.

12. The system as claimed in claim 11, wherein the receiving, the estimating, the comparing, and the instigating of the circuitry are repeated regularly.

13. The system as claimed in claim 10, wherein the estimating includes calculating a pseudo-speed value of said at least one second wheel based on the speed value at a center of said at least one second wheel according to:

$$w'_2 = w_2 \cdot \left(1 - \frac{1}{2}\left(\frac{\theta_v}{K}\right)^2\right)$$

where $w_2$ is the speed value at the center of said at least one second wheel, $\theta_v$ is a value of an angle at a steering wheel, coming from a steering wheel angle sensor, and where K is a value of a demultiplication factor of a steering column.

* * * * *